United States Patent [19]

Erlichman

[11] 3,977,012
[45] Aug. 24, 1976

[54] EXPOSURE CONTROL SYSTEM EMPLOYING A BLADE POSITION SENSOR

[75] Inventor: Irving Erlichman, Wayland, Mass.

[73] Assignee: Polaroid Corporation, Cambridge, Mass.

[22] Filed: Nov. 22, 1974

[21] Appl. No.: 526,391

[52] U.S. Cl. .................................. 354/29; 354/22; 354/44
[51] Int. Cl.² .......................................... G03B 7/14
[58] Field of Search ............................. 354/42–44, 354/22, 38, 29, 30, 270–274; 352/141

[56] References Cited
UNITED STATES PATENTS

| | | | |
|---|---|---|---|
| 3,418,903 | 12/1968 | Land et al. | 354/42 |
| 3,695,158 | 10/1972 | Fahlenberg | 354/60 X |
| 3,781,099 | 12/1973 | Williams et al. | 354/43 X |
| 3,832,722 | 8/1974 | Douglas | 354/230 X |

Primary Examiner—L. T. Hix
Assistant Examiner—James LaBarre
Attorney, Agent, or Firm—David R. Thornton

[57] ABSTRACT

An exposure control system for photographic apparatus utilizing motor driven shutter-diaphragm blades in conjunction with a blade sensor which is selectively positioned along the path of blade travel in accordance with an exposure value and which provides a control signal for reversing the blade drive to terminate the exposure interval. In the illustrated embodiment, the sensor is coupled to a comparison photometer and moved along the path of travel of the blades in accordance with photometer setting. Upon initiation of an exposure cycle, the blades are driven from a blocking position through progressively enlarging aperture values until the sensor is actuated by the blades. At this time the control circuitry is triggered to reverse the motor operation thereby returning the blades to a light blocking condition which terminates the exposure interval.

14 Claims, 2 Drawing Figures

EXPOSURE CONTROL SYSTEM EMPLOYING A BLADE POSITION SENSOR

BACKGROUND OF THE INVENTION

This invention relates to photographic apparatus and, more particularly, to an exposure control system for a photographic camera with semi-automatic controls for determining optimum exposure settings.

Fully automatic cameras employing exposure control systems which automatically evaluate scene brightness and regulate both the effective aperture size and the exposure interval in correspondence with the valuation of scene brightness are well known in the prior art. While such cameras ease the burden of the photographer, they represent comparatively expensive approaches to the problems of photographic instrumentation. Advantageously, the camera complexity and its attendant cost can often be reduced by utilizing semi-automatic control in which one exposure parameter is selected or determined by the operator while others are fully automatic. It is preferable, however, to provide an exposure control system requiring a single operator adjustment which completely determines the exposure cycle.

SUMMARY OF THE INVENTION

The present invention is addressed to a photographic exposure control system which in response to a single setting regulates both the effective aperture and the exposure interval. The control system includes motor driven, shutter-diaphragm blades in conjunction with a blade position sensor which, following an opening phase of the exposure interval during which continually enlarging aperture values are achieved, reverses motor operation thereby defining the maximum aperture achieved and the duration of exposure.

In a preferred arrangement, the sensor is present as a switch device whose position along the path of travel of the light regulating blades is determined in accordance with an operator selection. The switch element is coupled to the motor control network and is operable in accordance with blade engagement to signal the control network to reverse the motor thereby terminating the exposure interval. Hence, the switch element determines the film exposure by directly sensing the blade position rather than merely timing the exposure interval, and since the enlarging aperture values provide an increasing exposure factor which is directly sensed, reduces exposure errors.

In the method of operation, a blade position sensor is first located along the path of travel of aperture defining, shutter-diaphragm blades in accordance with an exposure value determination. The shutter-diaphragm blades are then driven from a closed position along the blade path to define increasing aperture values thereby initiating an exposure interval. Then in accordance with sensor actuation responsive to the blades reaching the sensor position, reverses the driving of the shutter-diaphragm blades to drive the latter back to their closed position to terminate the exposure interval.

In the illustrated embodiment, a comparison photometer is provided so as to aid the camera operator in selection of an appropriate aperture and interval. A pair of photometer regulating blades are mounted in the path of light from the scene to the photometer and are adjustable by the operator to provide null condition in the comparison photometer. The photometer blades carry a switch element which is located along the path of travel of the shutter-diaphragm blades in accordance with adjustment of the photometer system so that the switch position is related to the scene brightness.

Consequently, it is an object of this invention to provide an improved and simplified photographic exposure control system.

A further object of this invention is to provide an exposure control system and method for automatically determining an effective aperture size and an exposure interval in accordance with a single operator setting.

A still further object of this invention is the provision of a camera utilizing a comparison photometer to efficiently determine both aperture size and exposure interval in accordance with photometer adjustment.

Another object of this invention is to provide an exposure control system having a blade sensing arrangement which is positioned in accordance with an exposure value for automatically reversing drive operation of the shutter blades to control both the aperture value and exposure interval.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to note the same parts and wherein:

Referring now to FIG. 1, wherein a photographic camera 10 is shown diagrammatically therein to comprise a shutter support plate 12 having an exposure opening or aperture 14 located therein which in conjunction with shutter-diaphragm blades generally designated at 16 is configured to pass imagecarrying rays from a scene to be photographed along the optical axis of the camera 10 and to the focal plane (not shown) of the latter. A photometer aperture 18 of support plate 12 defines a portion of an optical path for a comparison photometer 17 of which a viewfinder indicator is shown at 38. Mounted over the photometer aperture 18 is a photometer diaphragm 20 formed by a second pair of blades 21 and 23, the latter being pivotally affixed to the plate 12 by a pivot indicated at 22.

Figure 1:
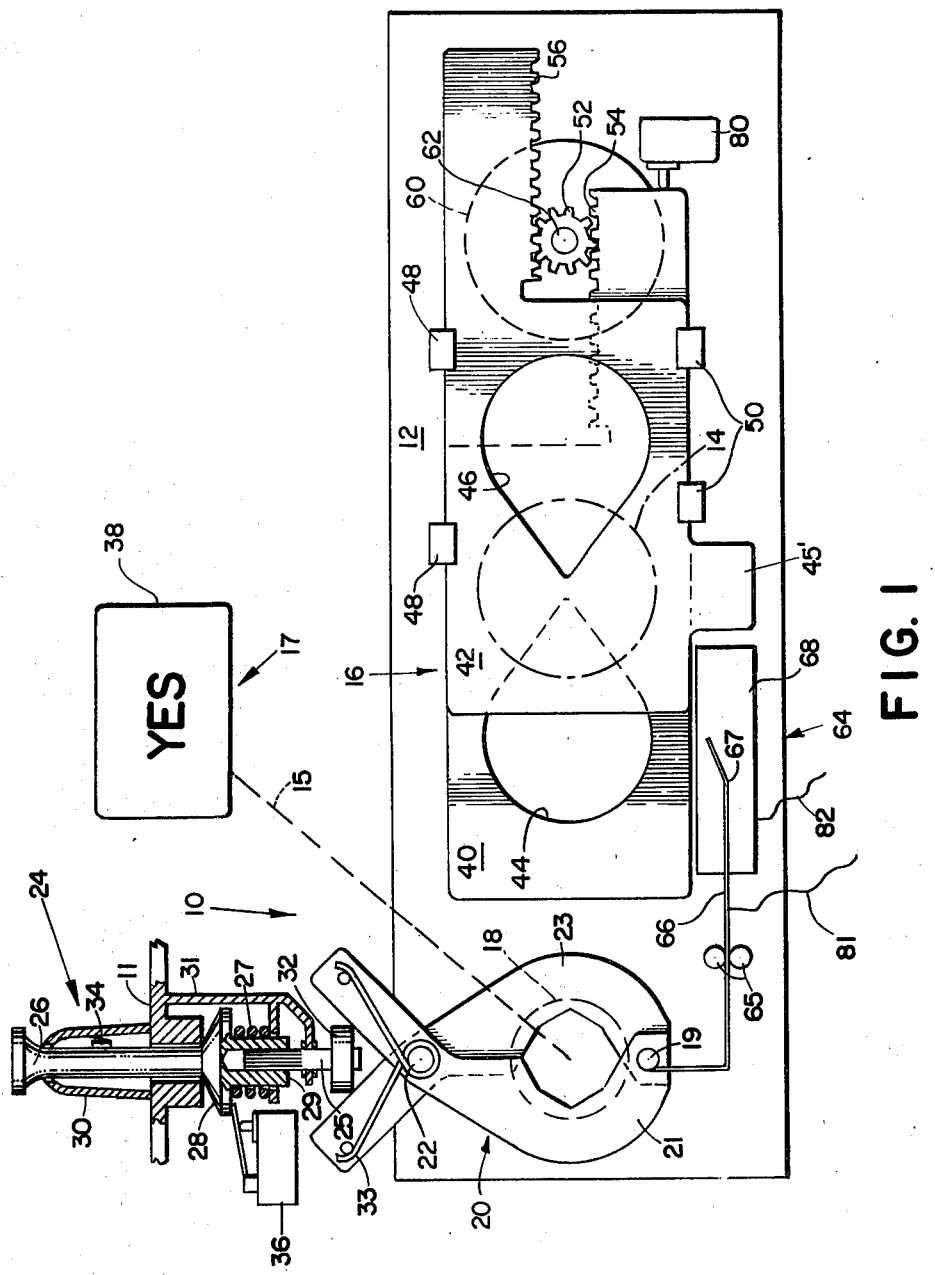
FIG. 1 is a diagrammatic illustration of the major components of a camera exposure control system constructed in accordance with this invention.

The photometer 17 is a conventional comparison photometer in which scene light passing through the photometer diaphragm 20 is compared to light from a known source (not shown) in the viewfinder-indicator arrangement 38 to determine a proper exposure value. In the illustrated embodiment, the viewfinder-indicator 38 shows a particular fixed pattern, for example, "yes" when the photometer diaphragm has been adjusted to a proper exposure setting. A suitable comparison photometer which utilizes a target pattern of light reflective areas interspersed with light transmissive areas which provide an index symbol in accordance with photometer balance is described in U.S. Pat. No.

3,368,447 issued to Edwin H. Land et al on Feb. 13, 1968. In this arrangement, any substantial departure from photometric balance results in concealment of one index symbol and the exhibiting of another index symbol. Hence, the operator is provided with a suitable indication when a proper aperture value has been selected for the photometer diaphragm 20 in accordance with scene brightness. Of course, other photometer arrangements, e.g., wherein the voltage output of a photocell is nulled against a predetermined voltage, would also be suitable.

A control knob 24, employed to initiate an exposure cycle as later explained in detail, also controls the operation of the photometer blades 20 in that rotation of the control knob 24 changes the relative angular position of the blades 20 and provides a particular photometer diaphragm opening correlated to the scene light intensity.

The control knob 24 includes a rotatable shaft 25, a slideable sleeve 26 and a resilient gripping knob 30. The sleeve member 26 extends through the top surface of the camera housing, a portion of which is shown at 11, and is slideably supported within a bracket 31 of the camera housing. Carried at the interior end 29 of the sleeve 26 is the shaft 25. The latter is rotatably supported within a bearing (not shown) of the bracket 31 and splined within the sleeve 26 such that rotation of the sleeve causes rotation of the shaft 25 while longitudinal displacement of the former has no effect on the shaft.

An elliptically shaped cam 32 carried at the end of the shaft 25 is coupled to the photocell diaphragm 20 and varies the selected aperture value of the latter (drives the blades 21 and 23 toward small aperture positions against the bias of a spring 33) in accordance with shaft rotation. The latter being achieved by means of a flexible gripper member 30 through which the sleeve 26 extends. A photometer switch 34 is located within the gripper member 30 and is operable to switch on the photometer 17 when the gripper member is squeezed for rotating of the shaft 24. Another switch element 36 is mounted below the sleeve member 26 and as later explained in detail with regards to the overall operation of the camera cooperates with a sleeve abutment 28 to initiate an exposure cycle in accordance with depression of, or longitudinal displacement of, the sleeve 26.

For a given brightness of the scene at which the camera is directed, there is essentially one correct exposure value, or that is combination of exposure aperture and exposure interval for providing a suitable photograph. Other factors also influence the exposure value, such as film sensitivity, the speed of movement of the shutter-diaphragm, etc., however these are assumed to be fixed and represented by the intensity of the photometer light source. Consequently, each setting of the photometer diaphragm can be understood to represent a different exposure value, and the correct exposure value for a given scene brightness is then that photometer diaphragm aperture value at which the light transmitted to the photometer is equal to the light of the known source.

In this arrangement, the operator viewing the scene grips the member 30 and rotates it to cause the photometer diaphragm 20 to increase or decrease until a suitable indication "yes" is seen in the viewfinder-indicator 38. Squeezing of the member 30 not only engages the sleeve 26 to permit rotation thereof but also activates the switch 34. The latter energizes the photometer so as to provide the light source for comparison and renders at least one of the indicators visible in the viewfinder-indicator 38.

Adjustment of the photometer diaphragm 20 varies the light transmitted from the scene to the viewfinder-indicator 38 such that when the transmitted light is made equal to the photometer source (which as previously noted provides a suitable "yes" indication in the viewfinder), the aperture value of the photometer and more importantly the location of the blades 21 and 23 is representative of the proper exposure value for the given scene brightness. As explained below, this photometer diaphragm setting is employed to control the exposure blade operation.

Figure 2:
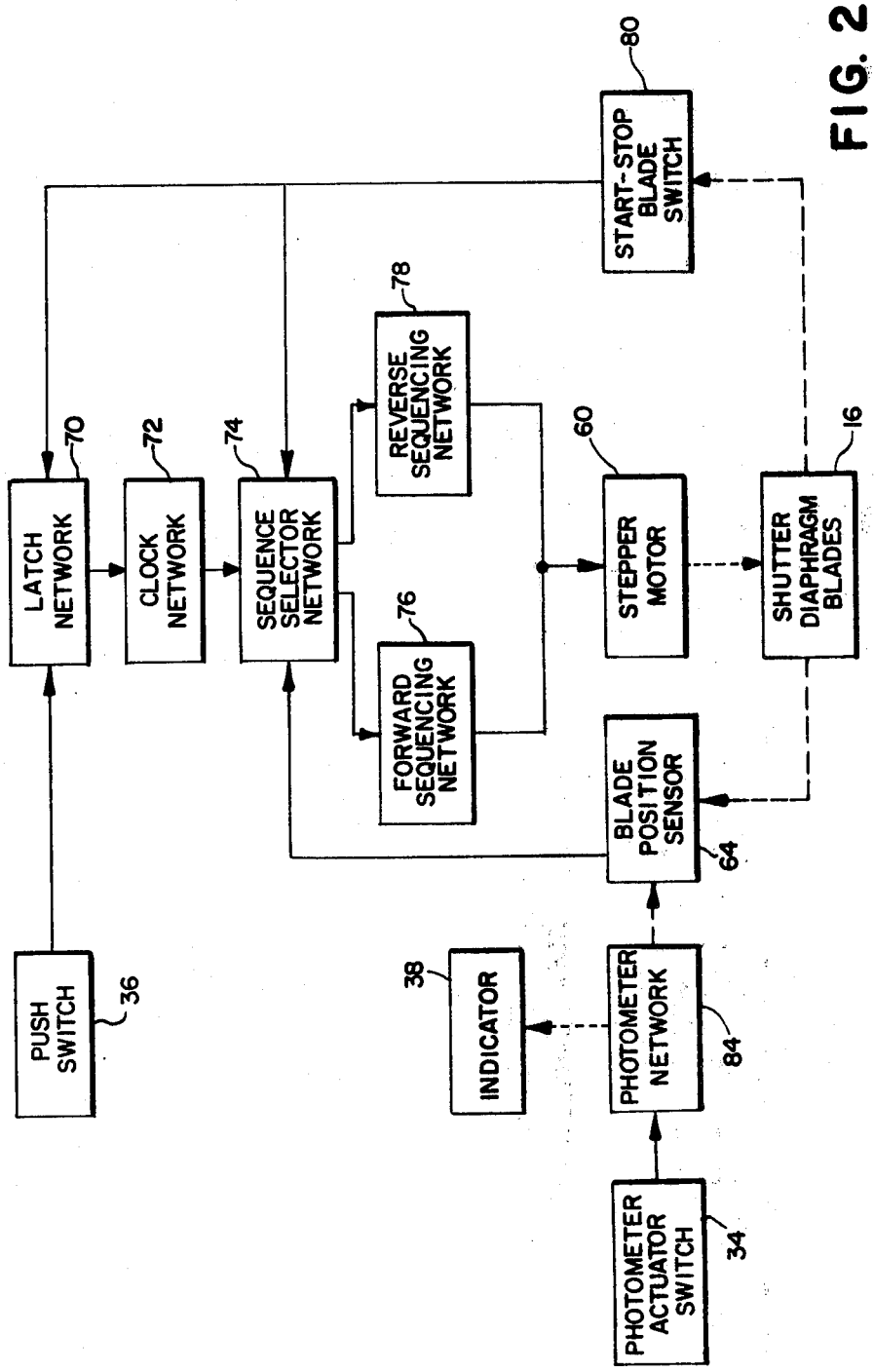
FIG. 2 is a block diagram of the electrical network utilized in the exposure control system illustrated in FIG. 1.

Turning now to the main diaphragm structure, it can be seen from FIG. 1 that the shutter-diaphragm blades 16 comprise two exposure elements or blades 40 and 42 slideably mounted upon the support plate 12 and formed with tapered apertures or main openings 44 and 46, respectively, which, during camera operation, overlap or, that is, are brought into at least partial registration with the exposure opening 14. Guide members 48 and 50 locate the blades 40 and 42 with respect to the exposure opening 14 and guide them for reciprocal displacement over the latter opening. A startstop blade switch 80, whose operation is explained in detail with regard to FIG. 2, is located at one end of the blades 40 and 42.

Synchronous movement of the blades 40 and 42 is realized by virtue of their mutual geared interconnection with a drive pinion 52; the latter being in connection to rack extensions 54 and 56 formed at one end of the blades 42 and 44, respectively. Driving power for displacement of the blades 42 and 44 is accomplished by means of a stepper motor 60 which is journaled within the pinion 52. When selectively energized, the motor 60, mounted on the support plate 12, is capable of driving the blades 40 and 42 from a closed position fully blocking the optical path as shown in FIG. 1 toward other positions (not shown) unblocking the optical path such that the openings 44 and 46 define a progressive variation of aperture values until a full aperture opening is reached.

A stepper motor drive suitable for the above is described in the copending application for U.S. patent by Irving Erlichman entitled "Non-Cocking Springless Shutter Developing Two Parameter Exposure Regulation", Ser. No. 362,926, filed May 22, 1973 and assigned in common herewith. In the above-noted application an exposure control mechanism is described in which a stepper motor is utilized to drive a pair of shutter diaphragm blades in synchronism so as to define a predetermined variation of aperture values over the camera optical path. That is, the blades are driven through a series of steps or halting positions defining gradual variations in aperture value in accordance with the stepper motor magnetic detents and responsive to successive impulses from a digital network. In the present invention while the stepper motor is utilized for step variation in aperture value during an exposure interval as set forth in the above-noted copending application Ser. No. 362,926, the exposure mechanism of the present invention is additionally controlled by a sensor unit 64 which is operative in accordance with shutter-diaphragm blade engagement during movement of the latter, for example, by engagement with a depending member 45 of the blade 42.

As illustrated in FIG. 1, the sensor 64 comprises a switch arm 66 which is located by a pair of guide members 65 in engagement with a contact pad 68. Both the arm 66 and the pad 68 are constructed of electrically conductive material such as a copper alloy and connected to the exposure control circuit (described below in detail with regards to FIG. 2) by printed circuit leads designated at 81 and 82.

It should be understood that since arm 70 and pad 68 operate as a switch, at least one of these must be insulated from other conductive portions of the camera circuit. The latter is easily provided by making the photometer blades 20 of insulative material such as a plastic. Similarly, the depending member 45, which becomes interposed between and disrupts the circuit connection of the switch arm 66 to the pad 68, should be of insulative material.

The switch arm 66 is pivotally coupled by a pivot member 19 to the blade 21 of the photometer diaphragm 20 and hence is displaceable with the latter such that the location of the contact point 67 with respect to the pad 68 is proportional to the photometer diaphragm setting. The selected position of the switch arm, or at least its contact point 67, in effect provides, in or adjoining the path of blade travel, a sensor location proportional to the exposure value setting. Stated otherwise, when the operator selects a proper aperture value for the photocell diaphragm in accordance with scene brightness, the switch arm 66 is positioned at a selective location alongside the path of travel of the blades 40 and 42 and in position to be engaged by the depending member 45 of the blade 42 so as to disrupt the contact between the switch arm 66 and the pad 68 which, as later explained in detail with regard to FIG. 2, reverses the drive operation. Hence, the sensor 66 provides means for controlling the operation of the exposure blades and, in particular, for reversing the drive operation thereof in accordance with the selected exposure value.

As shown in FIG. 2, the exposure control network includes a latch network 70 which is energized to a latching condition in accordance with operation of the push switch 36 when the sleeve 26 is depressed. The latch network 70, in turn, triggers a pulse generator or clock network 72 which produces drive pulses configured for operation of the stepper motor 60. The drive pulses are passed through a sequence selector network 74 and, in accordance with the operational setting of the latter, to either a forward sequencing network 76 or a reverse sequencing network 78 to control the directional operation of the stepper motor 60.

Passage of pulses to the forward sequencing network 76 operates the stepper motor 60 in a forward direction so as to initiate an exposure interval during which scene light is passed to the film while passage of pulses to the reverse sequencing network 78 will drive the stepper motor in a reverse direction so as to close the shutter blades and to terminate the exposure.

For clarity, the sequence selector network 74 and the sequencing networks 76 and 78 are shown as separate elements, however, it should be noted that they are generally combined in a single network as, for example, is described in a copending application for U.S. patent, Ser. No. 362,926, entitled "Non-Cocking Springless Shutter Developing Two Parameter Exposure Regulation", filed May 22, 1973 by Irving Erlichman and assigned in common herewith. The sequence selector network 74 can be provided by any conventional switching network which in response to appropriate signals will select the proper path to conduct the clock pulses to either of the respective sequencing networks 76 and 78. Likewise, the sequencing networks 76 and 78 may take the form of conventional stepper motor circuit logic arrangements which vary the pulse delivery to the motor in an appropriate manner to drive the latter in a forward or reverse direction.

Control of the sequence network 74 is provided by both the start/stop blade switch 80 and the blade position sensor 64. As shown in FIG. 1, the start/stop blade switch 80 is operative or, that is, "closed" in this embodiment when the shutter diaphragm blades 16 reach their light blocking position. This closed condition of the start/stop switch 80 arranges both the latch network for the latching operation (when a signal is received from the push switch 36) and the sequence selector network 74 for conducting pulses to the forward sequencing network 76. Consequently, upon initiation of the camera operation, since the start/stop blade switch 80 is in its closed position, the forward sequencing network 76 is operative to deliver drive pulses to the stepper motor in a forward sequencing arrangement so that the latter is driven forwardly thereby providing progressively enlarging aperture values in the exposure path.

Opening displacement of the shutter-diaphragm blade 16 is continued until they, or specifically the depending member 45 thereof, engages the blade position sensor 64, which thereupon provides a signal to switch the sequence selector network 74 to stop passage of pulses to the forward sequencing network 76 and to pass pulses to the reverse sequencing network 78. The latter pulse sequence stops and reverses the stepper motor 60 so as to initiate a termination phase of the exposure interval during which the shutter diaphragm blades are returned to their blocking condition.

Upon movement of the shutter diaphragm blade 16 back to their light blocking location, the start/stop blade switch 80 is again closed which signals the latch network to release, thereby de-energizing the clock network 72 to effect shutdown of the camera operation.

The general operation of the camera will now be described. Initially, as previously indicated, the operator energizes the photometer 17 by squeezing the section 30 of the control knob 24 and thereafter rotating the control knob to set the photometer to a proper value in accordance with scene lighting. Once a suitable indication has been achieved, the operator depresses the control knob 24 to close the switch 36 and start the exposure program. This latches the camera program "on" by means of the latch network 70 which triggers the clock network 72 and the sequencing network into operation to provide forward sequencing pulses to the stepper motor 60 so as to drive the shutter-diaphragm blades 16 in an opening direction (toward progressively enlarging aperture values) thereby initiating the exposure interval during which scene light is passed to the camera focal plane.

In the next step of the operation, the shutter-diaphragm blades 16 engage the blade position sensor 64 which, in turn, provides a reverse signal to the sequence selector network 74 which passes pulses to the reverse sequencing network 78 to drive the stepper motor in a reverse or blade closing direction thereby terminating the exposure interval. Finally, when the blades reach their closed position, the start/stop switch 80 releases the latch network 80 which de-energizes the camera.

In the illustrated embodiment, a comparison photometer is employed to select the location of the blade sensor 64. However, it should be understood that the latter comparison photometer merely provides an exposure value which could be determined by other means. Hence, the comparison photometer broadly provides means for selecting an exposure value and for positioning the blade sensor at a location along the path of travel of the blades in accordance with the selected value. Consequently, any suitable arrangement for adjusting the blade sensor in accordance with a selected exposure value will be suitable.

Those familiar with the photographic arts will readily appreciate the novel and highly unique advantages of this invention which provides a simple, economical arrangement for selecting both an effective aperture value and exposure interval in accordance with an exposure value. The exposure control system of the invention locates a blade sensor along the path of travel of a blade arrangement at a position functionally related to a selected exposure value so that the sensor will provide a termination signal when the blades reach the vicinity of the sensor during an opening phase of the shutter-diaphragm blades. The termination signal reverses the blade drive and thereby initiates the closing phase of the shutter-diaphragm.

Further, it can be readily seen that this invention may be practiced or embodied in still other ways without departing from the spirit or essential character thereof. The embodiment described herein is therefore illustrative and not restrictive, the scope of the invention being indicated by the appended claims, and all inventions which come within the meaning of the claims are intended to be embraced therein.

What is claimed is:

1. A photographic exposure control system for regulating the transmission of image-carrying light rays along an optical path to photographic film mounted at a given focal plane, said system comprising:
    a blade mechanism operative for unblocking the optical path to thereby initiate an exposure interval during which scene light is transmitted to the focal plane and for subsequently blocking the optical path to terminate the exposure interval, said blade mechanism being displaceable between a first arrangement wherein said blade mechanism is in blocking relation to the optical path and a second arrangement wherein said blade mechanism is in unblocking relation thereto, said blade mechanism defining progressively increasing exposure values during displacement from its said first arrangement to unblock the optical path and an additional exposure value which accrues during subsequent displacement to its said first arrangement to thereby block the optical path, said blade mechanism including at least one member mounted for displacement along a first path in accordance with displacement of said blade mechanism such that the position of said member along its said first path is in correspondence with each of said progressively increasing exposure values defined during said displacement of said blade mechanism from its said first arrangement;
    means for selecting a predetermined exposure value;
    control means for operating said blade mechanism to define an exposure value substantially equal to said predetermined exposure value, said control means including drive means activatable for operating said blade mechanism to unblock and thereafter block the optical path, energizeable sensor means for determining when said member has reached on said first path a predetermined position representing a defined exposure value substantially equal to the difference between said predetermined exposure value and said additional exposure value, said sensor means including an actuator portion and means for mounting at least said actuator portion for displacement along a second path at least parallel to said first path, said sensor means providing a given output signal when said member is displaced to within a predetermined vicinity of said actuator portion and actuating means when coupled to a source of power for activating said drive means to operate said blade mechanism to unblock the optical path, said actuating means including terminating means responsive to said sensor means for subsequently activating said drive means to operate said blade mechanism to again block the optical path thereby terminating said exposure interval.

2. The system of claim 1 wherein said member is a blade member configured for displacement between one position in blocking relation to the optical path and another position in unblocking relation thereto, said drive means includes a reversible motor for driving said blade member in a given direction toward said other position in accordance with a first input signal and in an opposite direction toward said one position in accordance with a second input signal, and said terminating means includes means responsive to said given output signal for terminating said first input signal to said motor and for initiating said second input signal thereto so as to reverse the operation of said motor and to displace said blade member back to said one position.

3. The system of claim 1 wherein said selecting means includes means for evaluating the brightness of the scene to be photographed and for determining an exposure value in correspondence thereto, and means for locating at least said actuator portion of said sensor in operative relation to said first path in a position selected in correspondence with said determined exposure value.

4. The system of claim 1 wherein said selecting means includes a comparison photometer having a diaphragm which is adjustable in accordance with the brightness of the scene to be photographed, and means for locating at least said actuator portion of said sensor means in a location selected in accordance with adjustment of said photometer diaphragm.

5. The system of claim 1 wherein said member is a blade member mounted for displacement between one position in blocking relation to the optical path and another position in unblocking relation thereto, said drive means includes a stepper motor configured for driving said blade member in one direction from said one position toward said other position in accordance with a first sequence of input pulses and in an opposite direction back toward said one position in accordance with a second sequence of input pulses and means responsive to said given output signal for terminating said first sequence of input pulses to said motor and for initiating said second sequence of input pulses thereto so as to reverse the operation of said motor and to displace said blade member back to said one position.

6. The system of claim 5 wherein said actuating means includes means for generating a train of input pulses, for conducting said input pulses to said stepper motor in said first sequence when said blade member is in said one position, and for conducting said input pulses to said stepper motor in said second sequence responsive to said given output signal.

7. The system of claim 3 wherein said blade mechanism includes a pair of elongated blade members mounted for displacement in opposite directions along a path substantially parallel to the longitudinal axes of said blade members, said sensor means being actuatable responsive to engagement of one of said blade members with said actuator portion, said means for mounting said actuator portion including means for mounting said actuator portion for movement along a path parallel to said longitudinal axis and adjacent to one of the longitudinal edges of said blade members, and at least one of said blade members having a step portion extended from the one edge of said one blade member and configured for engaging said actuator portion during displacement of said one blade member.

8. The system of claim 1 wherein said selecting means includes means for evaluating the brightness of the scene to be photographed, for determining said predetermined exposure value in correspondence thereto, and for locating at least said actuator portion in a position selected in accordance with said predetermined exposure value, and wherein said blade mechanism includes a pair of blade members, each of said blade members including an opening configured for unblocking the optical path in accordance with at least partial overlapping of the opening of one of said blade members with the other, and means for mounting said blade members for displacement in opposite directions along a given blade path between one position wherein said openings of said blade members are not in alignment with each other and the optical path and another position wherein said openings of said blade members are in substantial alignment with each other and the optical path, said blade openings being configured for providing progressively enlarging aperture values in operative relation to the optical path as said blade members are displaced from said one position toward said other position, said sensor means providing said given output signal when one of said blade members reaches said predetermined vicinity of said actuator portion, said drive means including a reversible motor coupled to said blade members, said motor displacing said blade members from said one toward said other position and back again responsive to first and second input signals respectively, and said terminating means includes means responsive to said given output signal for initiating input of said second signal to said motor.

9. The system of claim 1 wherein said blade mechanism includes a blade element mounted for displacement along a given blade path between one position wherein said blade element is in blocking relation to the optical path and other positions wherein said blade element is in unblocking relation thereto, said member comprising a step portion carried on and extending a given distance from one of the longitudinal edges of said blade element such that said first path is parallel to said blade path, and said means for mounting said actuator portion of said sensor means includes means for mounting at least said actuator portion along a path parallel to and adjacent said one longitudinal edge of said blade member such that said step portion is displaced to the location of said actuator portion during displacement of said blade element.

10. A method of controlling the operation of a photographic camera to expose photographic film, said camera having a shutter-diaphragm system comprising at least one blade member mounted for displacement along a given blade path from a position blocking the optical path along which scene light is transmitted to said film to other positions unblocking the optical path, said blade member defining during said displacement from said blocking position progressively changing aperture values through which scene light is transmitted to the film and progressively increasing exposure values to which the film is subjected, each of said blade defined exposure values being correlated to the position of said blade member along said blade path, and a sensor having an actuator portion, said sensor providing a given output signal when said blade member reaches a predetermined vicinity of said actuator portion, the method comprising the steps of:
  determining a desired exposure value;
  positioning at least said actuator portion of said sensor along said blade path in a position selected in accordance with said determining step;
  first driving said blade member along said blade path from said blocking position to initiate an exposure interval during which scene light is passed to the film; and
  subsequently driving said blade member back to said blocking position in response to said given output signal.

11. The method of claim 10 wherein said determining step includes evaluating the brightness of the scene to be photographed and determining said desired exposure value in accordance therewith.

12. The method of claim 10 wherein said system includes a motor configured for driving said blade member from said blocking position responsive to a first input signal and back to said blocking position responsive to a second input signal, said first driving step includes transmitting said first input signal to said motor, and said subsequent driving step includes terminating the transmission of said first signal while substantially simultaneously transmitting said second signal to said motor in response to said given output signal.

13. A photographic exposure control system for a camera, the camera having means for mounting photographic film at a given focal plane, and means for directing imagecarrying rays from a scene along a given optical path to the camera focal plane, said system comprising:
  a blade mechanism operative for blocking and unblocking the optical path and for defining at least one aperture value in operative relation thereto, said blade mechanism including a blade member configured for displacement along a given blade path between one position in blocking relation to the optical path and other positions in unblocking relation thereto, said blade mechanism being configured for defining progressively changing aperture values as said blade member is displaced from said one position;
  a sensor having at least an actuator portion, said sensor providng a given output signal when said blade member is displaced to within at least a predetermined vicinity of said actuator portion;

means for mounting at least said actuator portion for displacement along a sensor path at least substantially parallel to said blade path;

a comparison photometer configured for determining an exposure value in accordance with scene brightness;

means for coupling at least said actuator portion of said sensor means to said photometer so as to automatically position said actuator portion along said sensor path in accordance with the exposure value of said photometer; and means for displacing said blade member along said blade path from its said first position toward its said other positions to initiate an exposure interval during which scene light is directed to the focal plane and then, in response to said given output signal, for displacing said blade member again into blocking relation to the optical path.

14. The system of claim 13 wherein said comparison photometer includes an adjustable diaphragm and selectively operative means for adjusting said diaphragm to an aperture value selected to balance said photometer, and said coupling means includes means for coupling said diaphragm to said actuator portion of said sensor so as to position said actuator portion along said sensor path in accordance with the selected aperture value of said diaphragm.

* * * * *